Dec. 18, 1945.   O. S. CARLISS ET AL   2,391,123
VARIABLE SPEED-AND-DIRECTION OPERATED PILOT FINDER
Filed July 2, 1942   7 Sheets-Sheet 2
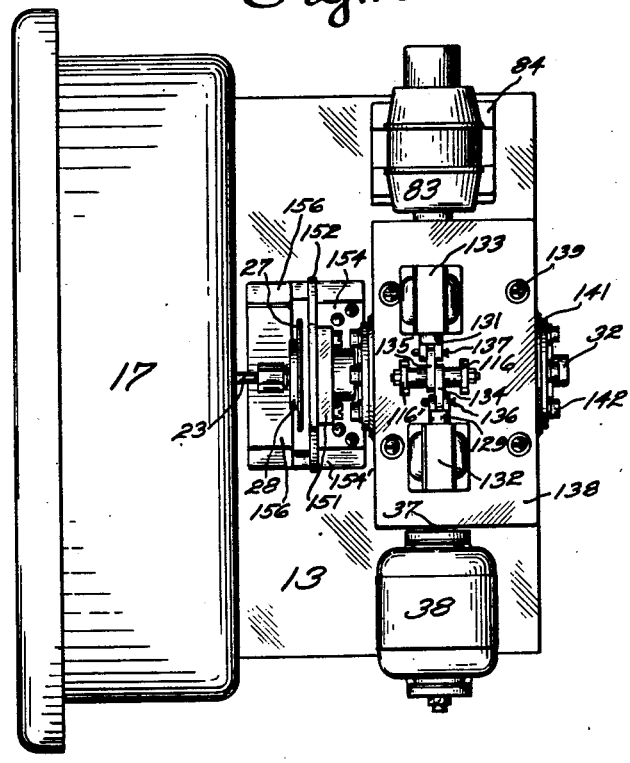
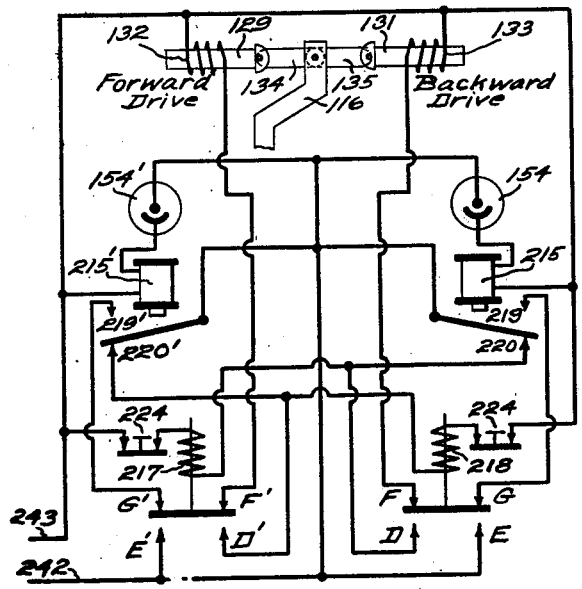
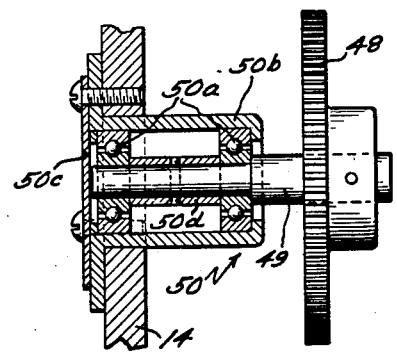
INVENTORS
Oswald S. Carliss
Charles G. Roper
BY
ATTORNEY

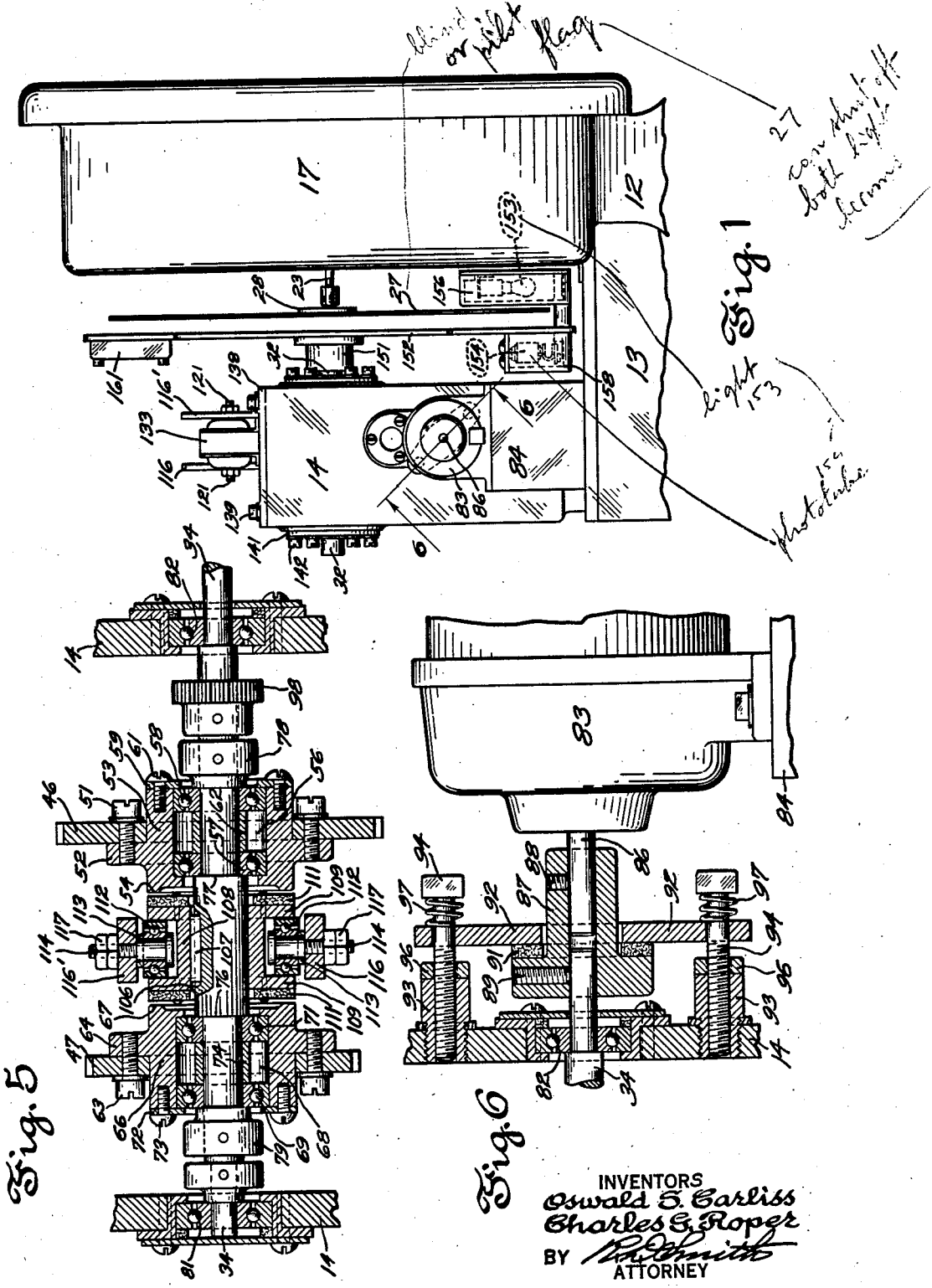

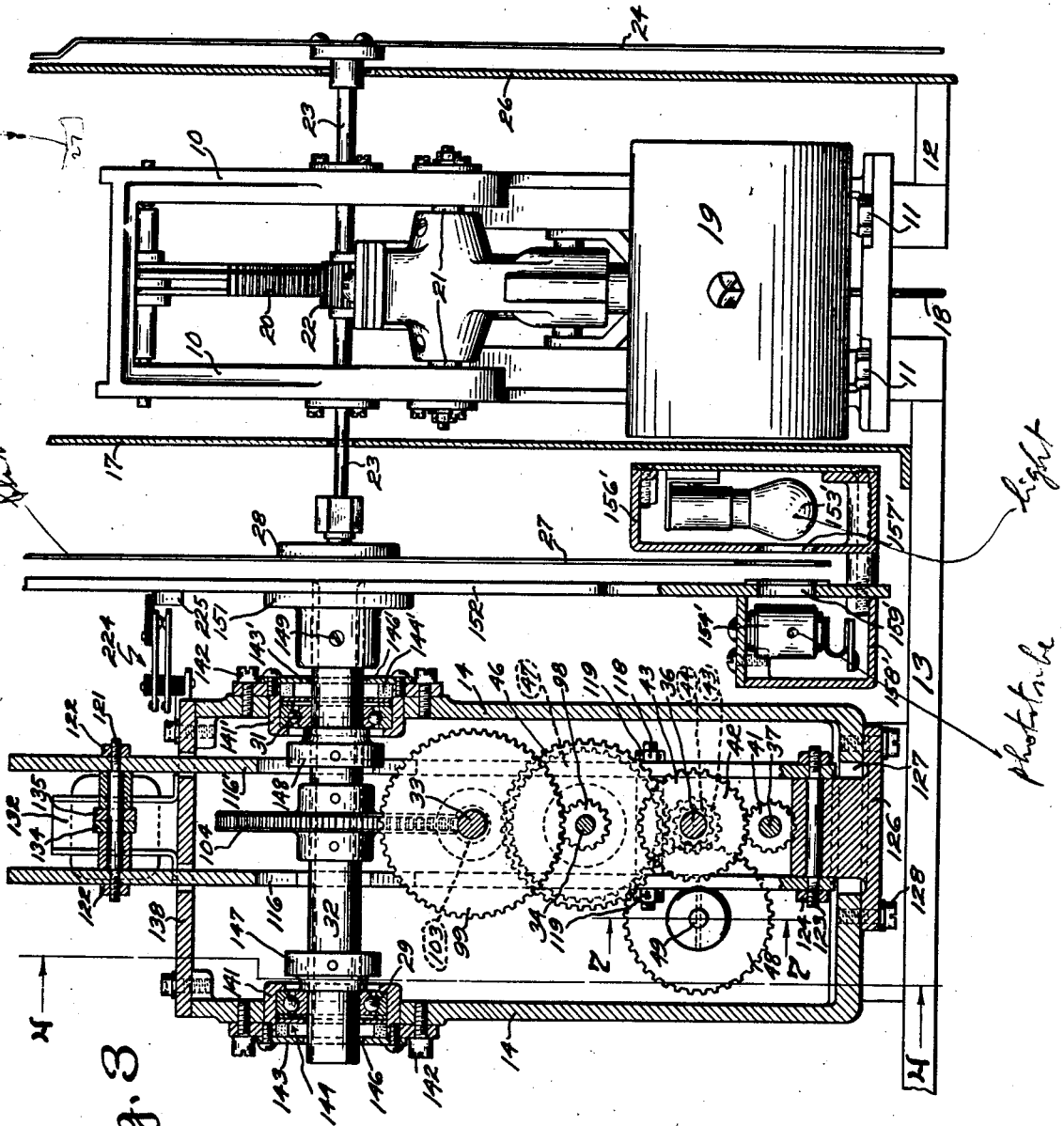

Dec. 18, 1945.  O. S. CARLISS ET AL  2,391,123
VARIABLE SPEED-AND-DIRECTION OPERATED PILOT FINDER
Filed July 2, 1942  7 Sheets—Sheet 4
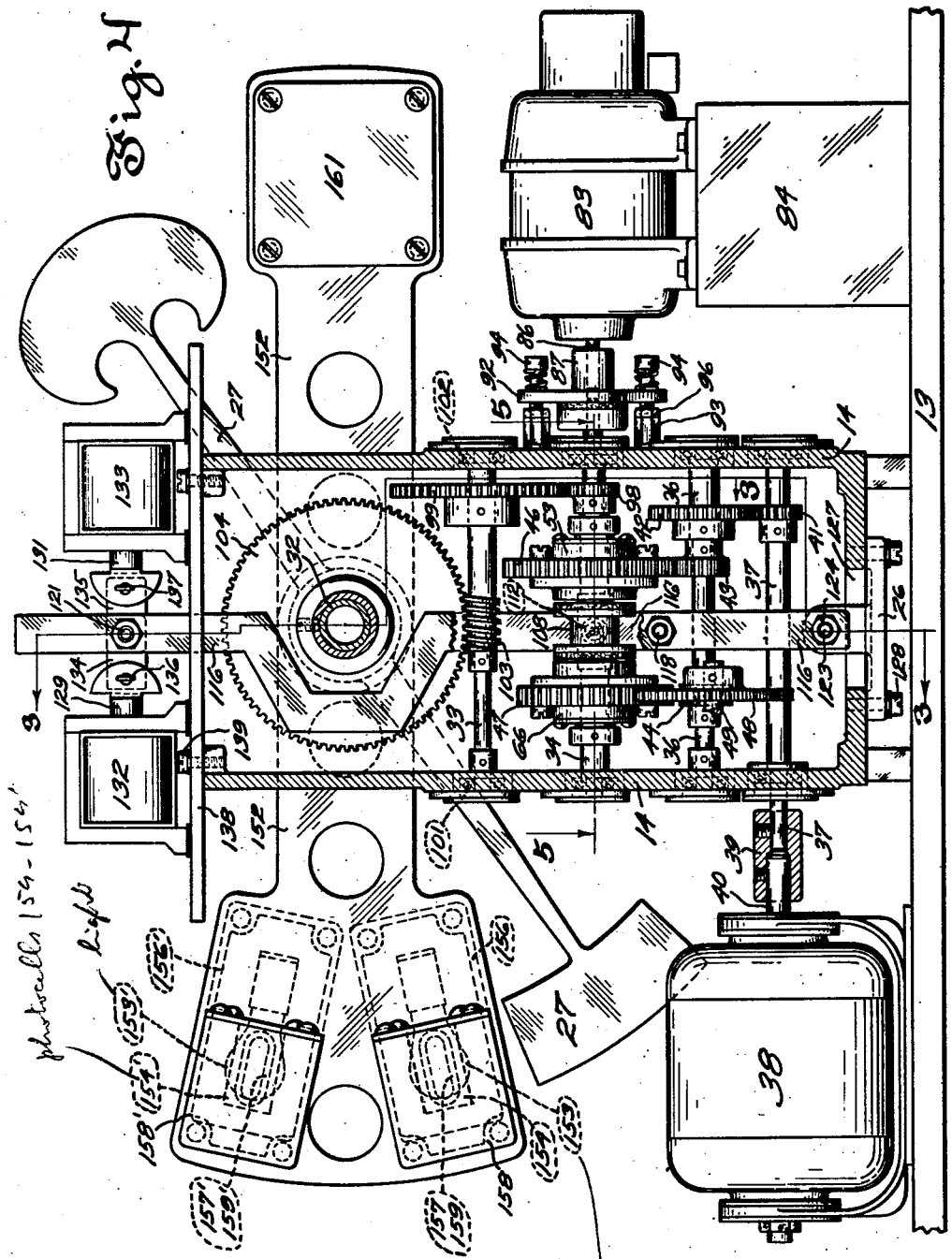

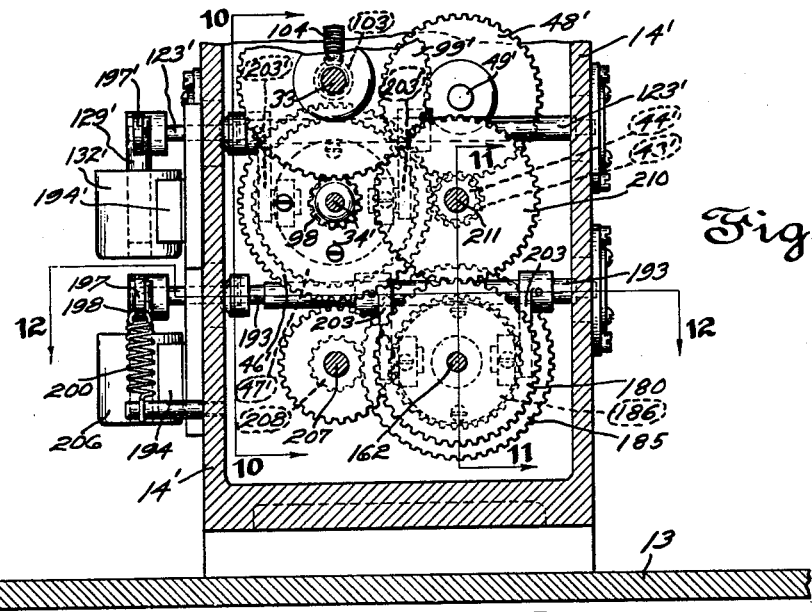
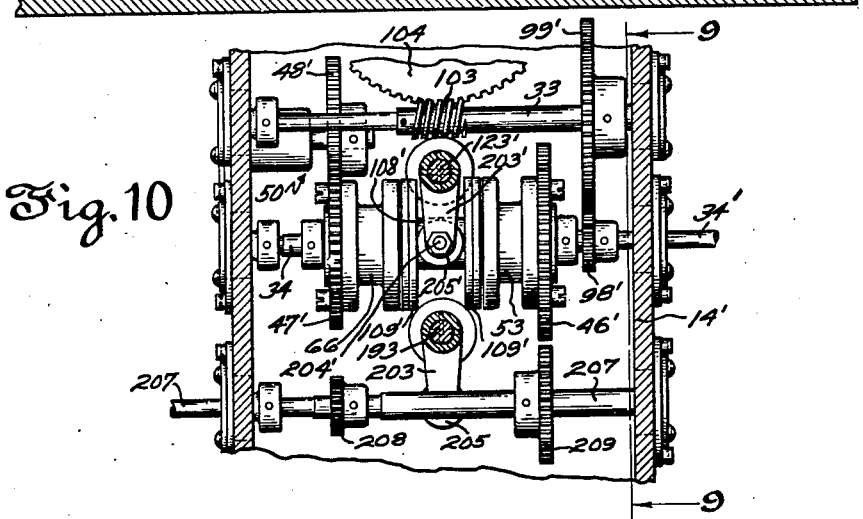
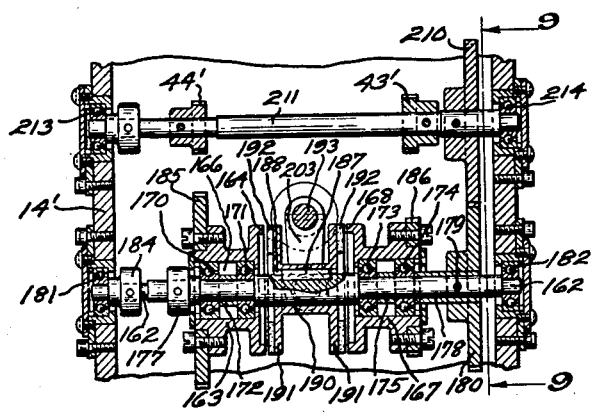

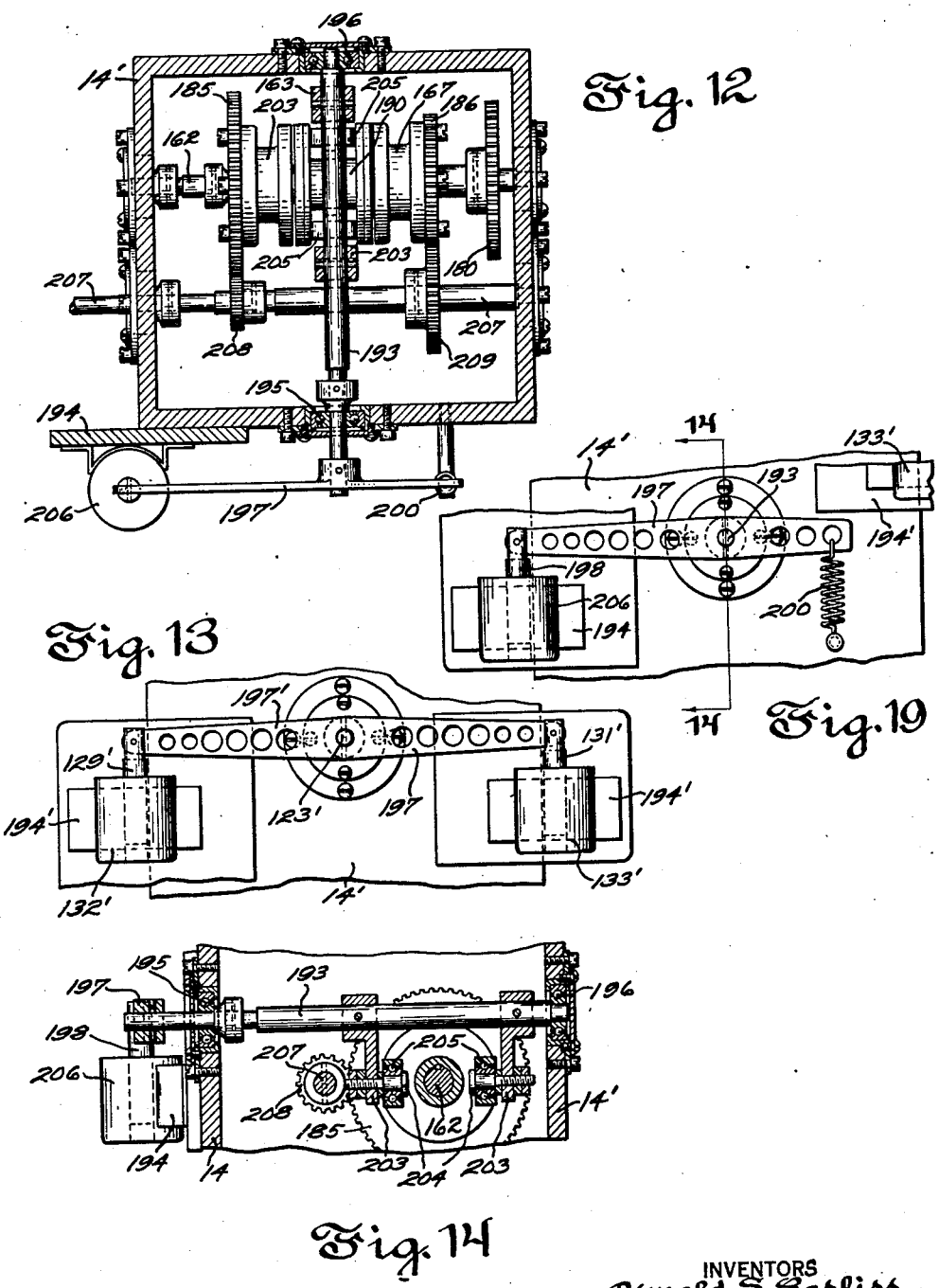

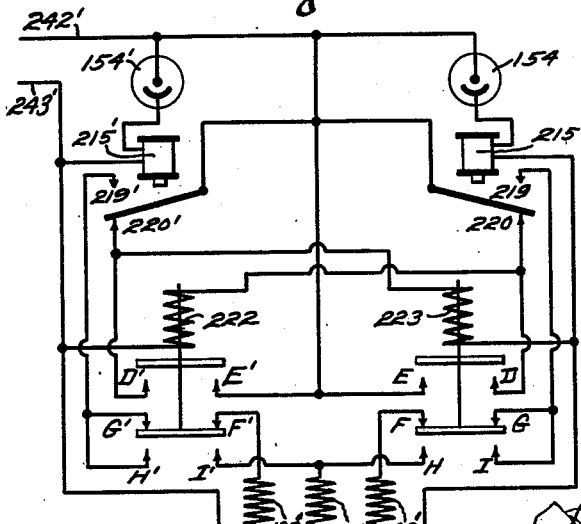
Fig. 17
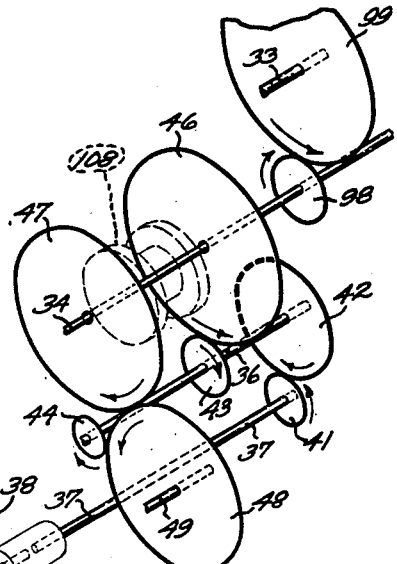
Fig. 15
Forward High Backward
Speed
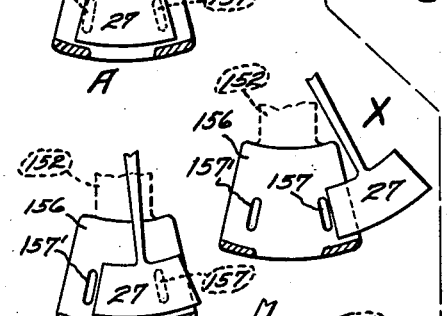
Fig. 18
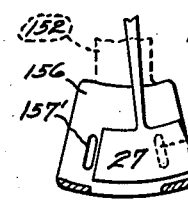
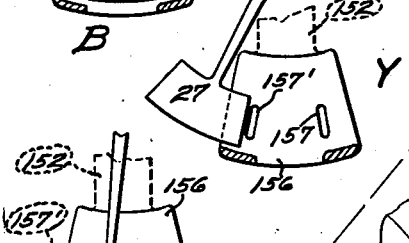
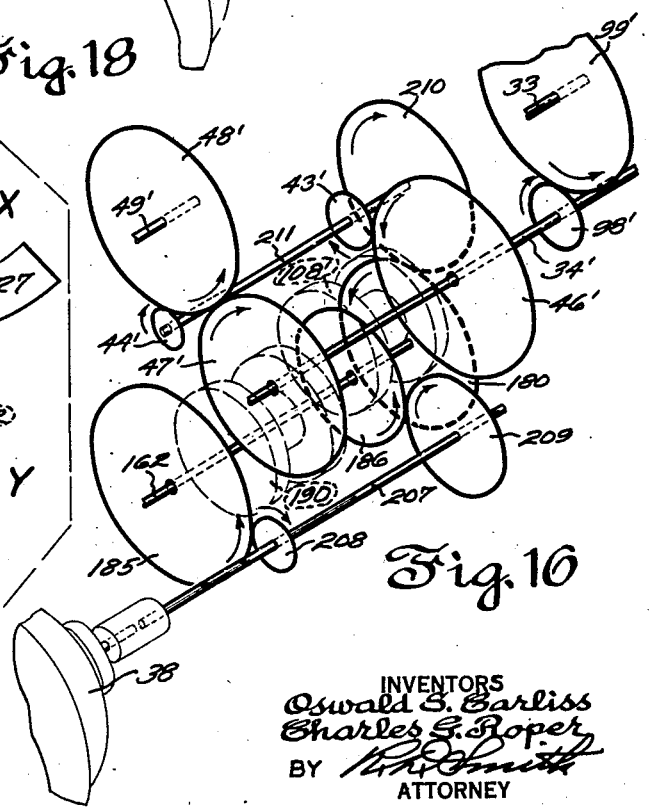
Fig. 16
INVENTORS
Oswald S. Carliss
Charles S. Roper
BY
ATTORNEY Patented Dec. 18, 1945

2,391,123

UNITED STATES PATENT OFFICE 2,391,123

VARIABLE SPEED-AND-DIRECTION OPERATED PILOT FINDER

Oswald S. Carliss and Charles G. Roper, Fairfield, Conn., assignors, by mesne assignments, to The Yale & Towne Manufacturing Company, Stamford, Conn., a corporation of Connecticut Application July 2, 1942, Serial No. 449,420

21 Claims. (Cl. 74—388)

This invention relates to so called repeating or pilot hunting apparatus in the art of reproducing, or making use at a remote point, of random indicator readings of some delicate measuring instrument such as a weighing scale. In apparatus for this purpose it has been attempted hereofore to provide an automatically operative finder that will repeatedly restore itself into register with some scale pointer or other sensitive indicator of the instrument by following random movements of the indicator in either of opposite directions of travel. Formerly there has been required in connection with such apparatus a complex system of electric circuits with a multiplicity of circuit controllers and interlocking relays. The best performance of these elaborate apparatuses and electrical systems has lacked the speed, positiveness and precision of action necessary for efficient translation of weight indication into, say, the registering of a corresponding magnitude of weight at some remote point, or the initiating of some desired mechanical or electrical effect responsive to a particular measurement of weight indicated by the scale.

Former attempts to eliminate physical contact between the delicately poised indicator of a measuring instrument, or pilot as it may be termed, and the finder that automatically seeks to maintain or restore itself in register therewith, have involved various contactless forms of circuit controllers including controllers that are sensitive to rays of light, or other radiant energy, projected toward them through space. For governing two-way automatic hunting of its pilot by such a finder there have heretofore been employed as many as three such light-sensitive primary controllers, or photoelectric cells. The use of so many primary controllers has necessitated corresponding complexity in the electric circuits. It has furthermore been proposed, as an expedient for reversing the direction of travel of the finder, to reverse the direction of running of the electric motor or other prime mover which serves to impel the finder. Successful operation of apparatus so organized is defeated by strong tendencies of the finder to overrun its goal in hunting for the pilot in either direction of follow-up travel.

One object of the present improvements is to prevent overshooting of its mark by the finder when it arrives in register with its pilot and thereby eliminate or reduce to a minimum the vacillations of the finder in its pilot hunting performance.

Another object is to eliminate delays in the automatic hunting action of the pilot which have heretofore been occasioned by the time required for several ganged relays to act serially.

Another object is to provide a reverse directional drive for the finder through the action of a reversing clutch which may also act as a brake to prevent or reduce any tendency of the finder to overrun.

Another object is to guard effectively against overrunning of the finder by arrangement of a gear transmission train interposed between the finder and clutch in a manner to be self locking against running movement except when the train is impelled by its designed source of power.

A further object is automatically to effect both starting and stopping of the hunting movement of the finder, and also to determine automatically the direction of such hunting movement, by the use of not more than two of the before mentioned photocells.

A further object is to provide alone, or in addition to the above mentioned reverse directional clutch or other reversing drive means, a variable speed drive clutch or other variable speed device which may cause the finder to be driven at variable speeds in each of its above mentioned reversible directions.

A further object is so to arrange non-contacting circuit controllers in the electrical system of the repeating apparatus that the finder shall be driven at relatively high speed when it has a considerable distance to travel to reach the pilot and shall be driven at relatively low speed when it has but a small distance to travel to reach the pilot.

A still further object is to combine the reverse directional drive means and the variable speed drive means in a unitary repeating apparatus and to combine the electrical directional controllers with the variable speed electrical controllers so that the finder may be driven at either of two speeds in either of its two directions of pilot follow-up movement.

Throughout the figures of the drawings the parts shown sectioned are viewed in the directions indicated by arrows applied to the designated section planes.

Fig. 1 is a side view of the dial head of an industrial weighing scale and a repeater unit incorporating the present improvements cooperatively associated therewith for automatically translating weight indication.

Fig. 2 is a plan view looking downward on Fig. 1.

Fig. 3 is an enlarged view of the interior mechanism of the repeater unit and scale head of Figs. 1 and 2 taken partly in section on the planes 3—3—3 in Fig. 4.

Fig. 4 is a view taken in section on the planes 4—4 in Fig. 3 looking in the direction of the arrows with the finder or sensing follower of the repeater unit in changed rotative position.

Fig. 5 is an enlarged view of direction changing clutch mechanism in the repeater unit taken in section on the plane 5—5 in Fig. 4.

Fig. 6 is an enlarged view of certain brake mechanism of the repeater unit taken partly in section on the plane 6—6 in Fig. 1.

Fig. 7 is an enlarged view taken in section on the plane 7—7 in Fig. 3.

Fig. 8 is a diagram of one electrical system usable with the apparatus of Figs. 1 to 7 and 16.

Fig. 9 is a view comparable with Fig. 3 showing a modification of the trains of transmission gears incorporating a speed varying clutch, parts being shown in section on the plane 9—9 in each of Figs. 10 and 11.

Fig. 10 is a view taken in section on the plane 10—10 in Fig. 9 showing the direction changing clutch.

Fig. 11 is a view taken in section on the plane 11—11 in Fig. 10 showing the speed varying clutch.

Fig. 12 shows a portion of the gear train incorporating the speed varying clutch viewed in plan from the section plane 12—12 in Fig. 9.

Fig. 13 is a fragmentary front view of the speed changing solenoid in Fig. 9 looking from the left at the latter figure.

Fig. 14 is a fragmentary view taken in section on the plane 14—14 in Fig. 13.

Fig. 15 is a tracer diagram showing isometrically the meshing and clearance relationship of the gear trains in Fig. 3.

Fig. 16 is a tracer diagram showing isometrically the meshing and clearance relationship of the gear trains in Fig. 9.

Fig. 17 is a diagram of an electrical system usable with the apparatus of Figs. 9 to 15, and 16.

Fig. 18 shows different typical relationships of finder to pilot when these parts are viewed as in Fig. 4.

Fig. 19 is a fragmentary front view of the direction changing solenoids in Fig. 9 looking from the left at the latter figure.

In explaining the service of the improved repeater unit for reproducing random indications of a sensitive measuring instrument, the parts of a conventional automatic load counterbalancing and weight indicating mechanism of an industrial dial scale have been chosen as illustrative of the sensitive instrument. These parts as shown in Figs. 1, 2 and 3 are supported between frame uprights 10 of the head unit of the weighing scale. Uprights 10 are firmly secured by bolts 11 to an underlying frame standard or column structure 12 of the type conventionally present in industrial scales except that for the purpose of the present improvements there is provided a rigid, laterally extending frame bracket 13 serving to support the box-like frame 14 of a repeater apparatus in fixed relation to uprights 10.

The frame uprights 10 and weighing mechanism supported thereby are commonly enclosed in a removable housing 17. The weighing mechanism may be constructed as shown in U. S. Patent No. 2,083,413, granted to Glenn Weist with modifications shown in Fig. 10 of U. S. Patent No. 2,173,746, granted to the same inventor. In the latter of these patents, the rear end of the weight indicating pointer shaft protrudes to the outside of the framework for taking auxiliary equipment thereupon. The pull of a weighable load (not shown) which is placed on the scale platform (not shown) draws downward on a draft link 18 which is provided with connections to swingingly lift to automatic load counterbalancing pendulums 19 that are rotatably supported on and between uprights 10. The swinging movement of pendulum 19 about its pivot 21 is transmitted by means of a pendulum operated cam and follower (not shown) through a gear segment 20 to a pinion 22 on the indicator shaft 23 which shaft is journaled antifrictionally in uprights 10. At one of its ends, shaft 23 carries a conventional rotary pointer or indicator 24 which sweeps over a suitable series of weight designating graduations (not shown) marked on the scale dial 26. At its opposite end and outside of housing 17, indicator shaft 23 carries auxiliary equipment in the form of a light-interceptive blind or pilot flag 27 having a hub fixed on shaft 23 and symmetrically balanced to avoid the setting up of any biasing torque on indicator shaft 23.

The repeater frame 14 provides bearings 29 and 31 for a finder shaft 32 which is aligned coaxially with the pointer shaft 23 but entirely disassociated therefrom in a mechanical sense. Repeater frame 14 is also equipped with other pairs of bearings in which are journaled four parallel shafts 33, 34, 36 and 37 located at different height levels. In the single-speed form of the invention, shown in Figs. 1 to 8, all of the above mentioned shafts are driven by power furnished by constantly running motor 38 whose direction and speed are substantially constant and whose armature shaft 40 is connected to the power shaft 37 by a coupling 39. Motor 38 is fixed on the frame bracket 13. Also, in a variable-speed form of the invention hereinafter described, the motor 38 runs constantly and unidirectionally at substantially constant speed.

In Figs. 3 and 4, power shaft 37 constantly rotates transmission shaft 36 through the intermeshed pinion 41 and gear 42 which are respectively fixed on said shafts. Transmission shaft 36 carries fixed thereon two axially spaced pinions 43 and 44, the former of which is in constant mesh with the ring gear 46 of a forward driving clutch member 53. The coaxial ring gear 47 of a reverse driving clutch member 66 derives power from pinion 44 through a reversing idler gear 48 whose shaft 49 is a stub shaft journaled in a bearing provided by frame 14 indicated as a whole by 50 in Fig. 7. The drawings make obvious the construction of bearing 50 wherein the ball bearings 50a are retained in the stationary frame-carried shell 50b by end plate 50c. The inner races of ball bearings 50a are definitely spaced apart by the collar 50d pinned to shaft 49.

Ring gear 46 is secured by bolts 51 to the flange 52 of clutch member 53, which member presents an annular clutch face 54. The body of clutch member 53 contains a cylindrical chamber 56 which receives and fits the outer races of two ball bearings 57 and 58 retained therein by a ring plate 59 secured to clutch member 53 by screws 61 as best shown in Fig. 5.

The inner races of ball bearings 57 and 58 are maintained axially separated by spacer collar 62. In like manner ring gear 47 is secured by bolts 63 to a flange 64 of clutch member 66, which clutch member presents the annular clutch face 67. The body of clutch member 66 contains a cylindrical chamber 68 which receives and fits the outer races of two ball bearings 69 and 71 retained therein by a ring plate 72 secured to clutch member 66 by screws 73. Ball bearings 69 and 71 are axially separated by a spacer collar 74.

Reductions in the diameter of shaft 34 provide a thrust shoulder 76 against the inner race of ball bearing 71 and a thrust shoulder 77 against the inner race of ball bearing 57. A thrust collar 78 is pinned on shaft 34 to bear firmly against the inner race of ball bearing 68 while a similar thrust collar 79 is pinned on shaft 34 to bear firmly against the inner race of ball bearing 69. Since ball bearings 57, 58, 69 and 71 are of a type adapted to withstand axial thrust, the ring gears 46 and 47 are perfectly free to rotate relative to shaft 34 whether or not axial pressure is exerted against either of the clutch faces 54 and 67. In Figs. 4 and 5 the left end of clutch shaft 34 is shown to be journaled in a conventional, axial thrust type of ball bearing 81 which is lodged in the repeater frame 14, while the right end of shaft 34 is journaled in a corresponding type of ball bearing 82 and extends therebeyond toward the right in Figs. 5 and 6 for rotating whatever device or apparatus it is desired shall move in exact proportion to the extent of rotative movement of the finder shaft 32. In the present example there is shown more particularly in Figs. 4 and 6 the rotary transmitter 83 of a synchronous generator-motor set which transmitter is secured on and in elevated relation to frame bracket 13 by means of the pedestal 84 so that the shaft 86 of the rotary transmitter or synchronous generator 83 is brought into end-to-end coaxial alignment with clutch shaft 34. Shafts 34 and 86 are connected by a coupling 87 fixed respectively to said shafts by set screws 88 and 89. Coupling 87 carries pinned or otherwise fixedly secured thereon a ring-like facing 91 of friction producing material against which is adapted to be pressed constantly toward the left an axially applied brake shoe 92 consisting of a diametrically disposed axially slidable bar apertured to admit freely therethrough the shank portion of coupling 87 and having two other slide bearing holes near its respective ends guided with a free sliding fit by bolts 94 threaded into frame posts 93. These posts are held rigidly in repeater frame 14 through threaded engagement therewith. Lock nuts 96 hold bolts 94 against jarring loose. This construction renders the posts 93 and bolts 94 so firm that they permit no swinging of brake shoe 92 about the axis of shafts 34 and 36. A spring 97, under compression between each bolt head and brake shoe 92, acts constantly to thrust the latter toward the left in Figs. 4 and 6 against friction facing 91. Thus at all times a braking effect is exerted which yieldingly opposes rotary movement of coupling 87 and hence of clutch shaft 34.

Clutch shaft 34 is further equipped with a pinion 98 fast thereon and constantly in mesh with a gear 99 fixed on worm shaft 33. The extremities of shaft 33 are journaled in conventional axial-thrust affording ball bearings 101 and 102 lodged in opposite side walls of repeater frame 14. Midway its length, shaft 33 carries the worm 103 fixed thereon which is constantly in mesh with a worm wheel 104 whose hub is pinned to the finder shaft 32.

There will now become apparent the manner in which clutch shaft 34 is driven in reversible rotative directions by one or the other of the opposite directional rotating clutch faces 54 and 67. The central portion of shaft 34 is of largest diameter and carries an axially extending key 107 that slidingly fits a corresponding keyway 106 in the shiftable three-position driven clutch spool 108. Each of the head flanges 109 of spool 108 carries fixed externally thereon a flat annular facing 111 of preferably quite hard friction material having a thickness which leaves an overall clearance or play of preferably not more than ten one thousandths to thirty one-thousandths of an inch between the clutch faces 54 and 67, and the clutch spool 108, including its friction facings 111.

The internal space between spool flanges 109 is filled with minimum running clearance by the outer race of a ball bearing 112 which is free to roll in contact with, while pressing against, either of said flanges in said space, and whose inner race is clamped firmly between a spacer washer 113 and the head of a stud 114 whose shank has threaded engagement with a long upstanding shifter lever 116 and is locked thereon by nuts 117. There are two of these ball bearings 112 and studs 114, alike, on diametrically opposite sides of the clutch spool 108 carried respectively by lever 116 and by a similar lever 116'. The two shifter linkage levers 116 and 116' are joined fixedly together to form a unitary swinging structure by means of a lower tie-rod 118 the central part of whose length serves as a rigid spacer for levers 116 and 116' and whose threaded ends, which are of reduced diameter, pass through clearance holes in said levers respectively and take the nuts 119 which clamp the tie-rod and levers firmly together. A similar tie-rod 121 connects the upper ends of shifter levers 116 and 116' fixedly together with the aid of clamp nuts 122, thus completing the joining of the two shifter levers into a rigid skeletonized structure pivotally mounted at its bottom ends to swing freely about the axis of pivot shaft 123. This pivot shaft is similar to tie rods 118, 121 and is made fast to the shifter levers by means of clamp nuts 124. Shaft 123 is journalled in a removable bearing bracket 126 which in part occupies an aperture 127 in the frame 14 of the repeater unit and is secured to the latter by bolts 128.

Shifter lever 116 is actuated back and forth, alternately from side to side in Fig. 4, by means of plungers 129 and 131 of two solenoid magnets 132, 133. Each of these plungers is operatively coupled to the tie rod 121 by a different one of the actuating links 134, 135 which pivotally engage the tie-rod and are pivotally connected to plungers 129 and 131 by pins 136 and 137, respectively. Magnets 132 and 133 are fixedly mounted on the top cover plate 138 of the repeater frame 14 which cover plate is secured in place by bolts 139.

Bearings 29 and 31 for finder shaft 32 are contained respectively in holding cups 141 and 141' secured to the repeater frame 14 by screws 142 and are retained by means of end plates 143, 143'. These plates are fastened to and cover the open ends of the bearing cups. Suitable dirt excluding and lubrication storing means indicated herein only generally at 144 and 144' are held axially against the outer races of ball bearings 29 and 31 by these end plates. The finder shaft 32 passes freely through apertures 146 and 146' in end plates 143 and 143' and carries pinned thereto a thrust collar 147 coacting with ball bearing 29 and also a thrust collar 148 coacting with ball bearing 31.

The end of finder shaft 32 which projects outward from the repeater frame toward the indicating mechanism of the weighing scale carries fixed thereon by means of set screw 149 the hub 151 of a finder arm 152 which is enlarged at one end for mounting thereon two sources of light represented by the respectively leading and trailing electric lamp bulbs 153, 153' together with the respectively leading and trailing, light-sensitive electric circuit controllers represented by the photocells 154, 154'. Lamps 153 are completely encased by housings 156, 156' respectively, each of which is slightly spaced from the finder arm 152. Housings 156 and 156' contain respectively the narrow light-passing apertures 157 and 157'. Photocells 154 and 154' are mounted within chambers formed cooperatively by finder arm 152 and by casings 158, 158' respectively, the former containing light-passing apertures 159, 159'. One end of finder arm 152 fixedly carries a weighting means 161 which counterbalances the combined weight of parts 153 and 153' to 159 and 159', etc., on the opposite end of the finder arm thereby to prevent unbalance of this arm. Finder arm 152 and all its carried parts are confined by their bearings and shapes to physically non-conflicting paths of rotary movement.

For purposes that later appear, the circumferential width or arcuate extent of the opaque pilot flag 27 is such as to just completely overlap both light-passing apertures 157, 157' (and 159, 159') thereby to fully cover both of said apertures simultaneously when pilot flag 27 and finder arm 152 exactly register. Therefore the smallest rotative displacement of pilot flag 27 relative to finder arm 152 will cause either the leading edge or the trailing edge of flag 27 to permit light to pass from either the leading or trailing lamp to its corresponding photocell through one of the aforementioned apertures.

In Figs. 9 to 14, inclusive, and 16, the direction reversing clutch spool 108' is mounted on a reversible direction clutch shaft 34' comparable to shaft 34 but whose position, as shown in Figs. 9 and 16, is nearer the front wall of the modified frame 14' of the repeater unit, or in other words more remote from the weighing-scale side of said unit than in Figs. 1 to 8, and 15. This makes room for a second, or speed-varying, clutch shaft 162 whose construction is generally similar to that of the direction reversing clutch shafts 34 and 34' and therefore need not be described in great detail. It will suffice to say that the assembled construction of the parts carried by speed varying shaft 162, as shown in section in Fig. 11, is like that of corresponding parts carried by the direction reversing shaft 34 as shown in section in Fig. 5.

The low-speed clutch member 163 with its annular clutch face 164 and ball bearing containing chamber 166 may be substantially like parts 53, 54 and 56, respectively, while the high-speed clutch member 167 with its annular clutch face 168 and ball-bearing containing chamber may be substantially like parts 66, 67 and 68. The ball bearings 170, 171 for the slow speed clutch member may be like ball bearings 57 and 58, and are axially separated on shaft 162 by spacer collar 172. Ball bearings 173 and 174 in clutch member 167 are like parts 69 and 71 and are axially separated on shaft 162 by the spacer collar 175. Shoulders on shaft 162 serve to space ball bearing 173 from ball bearing 171. A thrust collar 177 is pinned on shaft 162 and bears against the inner race of ball bearing 170, while a similar thrust collar 178 is pinned on shaft 162 to bear against the inner race of ball bearing 174. A pin 179 securely fixes both collar 178 and the hub of a gear 180 to shaft 162. The ends of this shaft are reduced in diameter and journaled in ball bearings 181 and 182 which are removably lodged in walls of the repeater frame 14' and provide thrust in both directions for shaft 162 with the assistance of an axially settable thrust collar 184.

A ring gear 185 is bolted fixedly on the low speed clutch member 163 while another ring gear 186 is bolted fixedly on the high speed clutch member 167. From a comparison of Figs. 5 and 11, it will be clear that clutch shaft 162, in the manner of clutch shaft 34, may be driven by one or the other of the clutch faces 164 and 168. These faces rotate in the same direction, but at different speeds as is hereinafter explained. The largest or central portion of shaft 162 carries an axially extended key 187 that slidingly fits a corresponding keyway 188 in the shiftable clutch spool 190. Each of the spaced head flanges 191 of spool 190 carries fixed externally thereon a flat annular facing 192 of suitable friction material having a thickness which leaves a very small amount of clearance or play between the clutch faces 164 and 168 and the overall length of the clutch spool.

In Figs. 9 to 14 both of the clutch spools 108' and 190 are seen to be acted upon by a somewhat different type of shifter linkage mechanism than is employed in Fig. 4. In each case this modified shifter mechanism takes the form of crank arms pivotally swung from points above the clutch shafts. The mechanism for shifting the variable speed clutch includes a rocker shaft 193 having its ends journaled in ball bearings 195 and 196 which are lodged removably in the front and rear walls of repeater frame 14'. One end of shaft 193 projects in front of the frame wall and thereat carries fixedly the rocking beam 197. One end of beam 197 has pivotally connected thereto the vertical plunger 198 of a pulling solenoid 206. The other end of beam 197 has connected thereto the frame anchored spring 200. Solenoid 206 is fixed on the outer surface of frame 14' by means of a mounting plate 194 which may be welded or bolted to the frame wall. At the inside of the frame walls, rocker shaft 193 carries fixed thereon a pair of spaced depending shifter arms 203 each of whose lower ends carries a stud 204 mounted by threaded engagement therewith in the manner of stud 114 in Fig. 5. The head of stud 204 fixedly clamps against each shifter arm the inner race of a ball bearing 205 whose outer race fills with minimum running clearance the axial space between flanges 191 of the clutch spool 190 so as to roll freely in contact with either of said flanges while pressing forcibly thereagainst.

The direction reversing clutch shifting mechanism as modified in Figs. 9 and 10 includes a rocker shaft 123' having its ends journaled in ball bearings 125 and 125' removably lodged in the front and rear walls of repeater frame 14. One end of shaft 123' projects in front of the frame wall and thereat carries fixedly the rocking beam 197'. One end of beam 197' has pivotally connected thereto the vertical plunger 129' of a pulling solenoid 132'. The other end of beam 197' has pivotally connected thereto the vertical plunger 131' of a pulling solenoid 133'. Both solenoids 132' and 133' are mounted by plates 194' similar to plate 194. At the inside of the frame walls rocker shaft 123' carries fixed thereon a pair of spaced depending shifter arms 203' each of whose lower ends carries a stud 204' fixedly clamps against each shifter arm the inner race of a ball bearing 205' whose outer race fills with minimum running clearance the axial space between flanges 109' of clutch spool 108' so as to roll freely in contact with either of said flanges while pressing forcibly thereagainst.

In Figs. 3 and 15 the shaft 37 of motor 38 is seen to carry a single pinion 41 which transmits drive to the gear 42 on transmission shaft 36. But in the modified gear trains of Figs. 9 and 16, the modified motor shaft 207 carries a low speed drive pinion 208 and a high speed drive pinion 209, the former of which meshes with the aforementioned gear 185 on the low speed clutch member 163 and the latter of which meshes with the aforementioned gear 186 on the high speed clutch member 167. Through the variable speed clutch shaft 162 the drive is then continued on through the aforementioned gear 180 which is constantly in mesh with gear 210 on the modified transmission shaft 211 journaled in ball bearings 213, 214 removably lodged in the walls of repeater frame 14'. Gear 210 is thus comparable to gear 42 on transmission shaft 36 in Figs. 1 to 5. All of the remainder of the train beyond modified transmission shaft 36, and by which the finder is driven through the direction reversing clutch, may be similar to that of Figs. 1 to 5, and all gears of such train which have not heretofore been specifically mentioned are designated by the same reference numerals primed as in said Figs. 1 to 5. It will be noted that the idler or reversing gear 48' has been moved from a lower left position in the train of Fig. 4 to an upper right position in the modified train of Fig. 9.

An understanding of the operation of the form of the invention illustrated in Figs. 1 to 7, inclusive, will be aided by joint reference to Fig. 8, illustrating certain electric equipment and circuit connections that may be employed, with Fig. 15 which shows diagrammatically the meshing relationships of all gears in the direction reversing power train, and with Fig. 18 showing different relationships of pilot and finder which differently influence the electric circuits of Fig. 8.

The pilot flag 187 and the finder arm 152 are termed normally conditioned in Figs. 1, 2 and 3 corresponding to relationship (A) in Fig. 18. It is assumed that the weighing scale is without load and that the weight indicator 24 consequently points vertically upward to "zero" on the scale dial 26. Pilot flag 27 and the photoelectric circuit controllers 154, 154' occupy the lowest position in their circle of swing and flag 27 just covers both of apertures 159 and 159'. Motor 38 is assumed to be electrically powered independently of the circuits shown in Fig. 8 and to be running constantly in a single direction at fixed speed and thereby to rotate transmission pinions 43 and 44 constantly in the direction of the arrows in Fig. 15. Clutch gears 46 and 47 are therefore constantly running at equal rotary speed but in opposite directions because of the interposition of reversing gear 48 between transmission pinion 44 and clutch gear 47. However no power is now transmitted to the clutch shaft 34 by trains either of direction differing gears including 46, 47 because the clutch spool 108 is in neutral position being unbiased by either of electromagnets 132 or 133.

In the above described starting condition of the mechanical parts current from supply lines 242, 243 cannot pass through photocells 154, 154' because the electrical resistance thereof is too high in the absence of any play of light upon these photocells from lamps 153, 153' through apertures 159, 159', respectively. Hence the magnet windings of both relay switches 215 and 215', associated with the photocells, are deenergized and the contacts of these photocell relays are positioned to supply current to the windings of the interlocking relays 218 and 217 so that the contacts of the latter assume their upper positions shown in Fig. 8 wherein both of the clutch operating solenoids 132 and 133 are deenergized causing the clutch to occupy its neutral position as aforesaid.

A weighable load is now placed on the scale and will become automatically counterbalanced by the lifting of pendulums 18. This results in commensurate rotation of the weight indicating pointer 24 and of pilot flag 27 counterclockwise in Fig. 4. Such movement of the pilot produces an electrical effect in the circuits of Fig. 8 upon the slightest displacement of the pilot relative to the finder. Typical displacement is represented by relationship (B) of Fig. 18. In this relationship of finder to pilot, aperture 157 remains covered by flag 27 but aperture 157' becomes newly uncovered so that light from lamp 153' is played upon phototube 154'. This energizes relay magnet 215' which thereupon attracts its armature and establishes a circuit through contact 219' and breaks circuit at contact 220' thus deenergizing the coil of interlocking relay 216, whose contact bridging bar drops to break circuit through contacts F—G and establishes circuit through contacts D—E for insuring that relay 217 shall not be deenergized if contact 220 should be opened. Clutch shifting solenoid 132 thus is energized through contacts 219', G' and F' and pulls the clutch spool 108 toward the left and into frictionally driven engagement with clutch member 56 in Figs. 4 and 5 so that clutch shaft 34 becomes driven in the direction of the arrow applied to pinion 98 in Fig. 15. This rotates the worm shaft in the direction of the arrow applied to gear 99 in Fig. 15 and worm 103 turns worm wheel 104 and finder shaft 32 counterclockwise in Fig. 4. Thus the finder arm 152 proceeds to follow up the pilot by traveling in the same direction as that in which the pilot was displaced.

Referring again to Fig. 8, if the follow-up travel of the finder arm succeeds in restoring relationship (A) of finder to pilot in Fig. 18 then all electrical parts are restored to their condition shown in Fig. 8 and clutch spool 108 assumes neutral position again. Instantaneous stopping of the follow-up travel of finder arm 152 will result because coasting is prohibited by constantly acting brake 92, while the finder arm will remain locked in its automatically stopped position in even register with the pilot because worm gear 104 is incapable of turning worm 103 but is always either impelled thereby or locked thereby against accidental rotative disturbance.

If, however, due to unforeseen causes, the finder should overshoot its mark of restored registry with the pilot, i. e., that relationship indicated as (A) in Fig. 18, then the relationship (C) of finder to pilot would result. Here aperture 157' is covered by flag 27 and aperture 157 becomes uncovered whereupon photocell 154 and its controller relay 215 act to deenergize the coil of interlocking relay 217 which breaks circuit through contacts G', F' and establishes circuit through contacts D'—E' which insures that relay 218 shall not be deenergized if contact 220' should be opened. Clutch shifting solenoid 133 is thus energized through contacts 21, D and E which pulls clutch spool toward the right in Figs. 4 and 5 into frictionally driven engagement with reversely rotating clutch member 53. This rotates all of parts 34, 98, 99, 33, 103 in the opposite directions from those indicated by arrows in Fig. 15 and impels finder arm 152 in the opposite or clockwise direction in Fig. 4 until the registering relationship A of finder to pilot is restored. Thereupon movement of the finder arm instantly ceases and the latter remains again automatically locked by worm 103 in a manner which will be clear from the foregoing description. One or more limit switches as 224 having normally closed contacts may be mounted at any locations on either of frames 14 or 14' and arranged to be engaged by a lug 225 or the like carried by finder 152 for preventing impelling of the latter past any predetermined point in either direction of travel. See Figs. 3 and 8.

Should continued abrupt swinging of the weight indicating pointer to its weighing position further displace the pilot in either direction to a relationship to the finder arm such as indicated at (X) or (Y) in Fig. 18, wherein apertures 157 and 157' are both uncovered, then from the foregoing description of the electric circuits it will be clear that both photocells 154 and 154' will receive light and energize the magnets of both relays 215 and 215'. But inasmuch as the contact bridging bar of one or the other of the interlocking relays 217 or 218 will always be found dropped when the second one of the apertures 157 and 157' becomes uncovered, the inability of current to pass from contact F to G in the one case, or from contact F' to G' in the other case, will always prevent undue energization of both clutch solenoids 132 and 133 at the same time. In other words no different mechanical effect is produced on the clutch or on the train of gears associated therewith when both apertures 157 and 157' are uncovered than when only a single one of these apertures is uncovered.

But in the wiring diagram of Fig. 17, use is made of the uncovering of two, instead of only one of the apertures 157, 157' to produce an increase of speed with which the finder is caused to travel in following up the pilot. The starting condition of the apparatus of Figs. 9 to 14 and 16, wherein speed changing mechanism is added to the direction reversing mechanism of Figs. 1 to 8 and 15, is represented as before by the relationship (A) of finder and pilot in Fig. 18. The electrical equipment and circuits are conditioned as represented in Fig. 17. Photo-electric cells 154 and 154' are both deprived of light rays and offer too much electrical resistance to permit the magnets of their respective controller relays 215 and 215' to be energized. The controller relay contacts 220 and 220' pass current to the windings of interlocking relays 222 and 223 which are both simultaneously energized producing the following condition of contacts in interlocking relay 223; D—E open, F—G bridged, and H—I open: and causing the following condition of contacts in interlocking relay 222; D'—E' open, F'—G' bridged and H'—I' open. Hence each of the three clutch solenoids 132', 133' and 206 are deenergized. This causes direction clutch spool 108 to be in neutral position and speed clutch spool 190 to be in slow speed biased position as biased by spring 200.

Displacement of pilot flag to relationship (B) in Fig. 18 admits light to photocell 154' energizing magnet 125' and shifts current supply derived through the lines 242', 243' from contact 220' to 219'. This energizes the forward drive clutch solenoid 132' through the already bridged contacts F'—G' and simultaneously deenergizes interlocking relay 223 thus opening contact F—G and bridging contacts D—E as well as H—I. The bridging of contacts D—E "interlocks" coil 222 by supplying current through line 242' independently of contact 220. Finder 152 now proceeds to travel forward (or counterclockwise in Fig. 4) at slow speed impelled through gears 208, 185, 180, 210, 43', 46', 98', 99' and the worm 103.

If pilot flag 27 should become sufficiently displaced from finder 152 to produce relationship (X) in Fig. 18, photocell 154 will receive light together with photocell 154' and energize controller relay 215 to shift the current supply from contact 220 to 219.

Now both controller relays 215 and 215' are energized, but as explained in connection with Fig. 8, this produces no change in the condition of the interlocking relays 222, 223 nor in the solenoids 132', 133' of the direction controlling clutch 108'. However, the furnishing of current to either of contacts 219 or 219' while the other of said contacts is already closed does energize the solenoid 206 of the high speed clutch through either of extra contacts H—I or H'—I' on the interlocking relays whereupon clutch spool 190 is shifted to the right in Fig. 11 against the resistance of spring 200 and into frictionally driven engagement with the high speed clutch member 167. Under these conditions finder 152 is impelled at increased speed through gears 209, 186, 180, 210, 43', 46', 98', 99' and worm 103. At slow speed backward (or clockwise in Fig. 4) the drive is through gears 208, 185, 180, 210, 44', 48', 47', 98', 99' and worm 103. At high speed backward (or clockwise in Fig. 4) the drive is through gears 209, 186, 180, 210, 44', 48', 47', 98', 99' and worm 103.

From the foregoing it is seen that relationship (A) in Fig. 18 maintains the finder stationary; that relationship (B) causes slow-speed travel of the finder in a forward direction to follow the pilot in that direction; that relationship (X) causes high-speed follow-up travel of the finder in the same direction; that relationship (C) causes slow-speed travel of the finder in backward direction; and that relationship Y causes high-speed backward follow-up travel of the finder.

For advantageous action the gears hereinbefore enumerated may have the following respective numbers of teeth:

*Gear train of Fig. 15*

| Reference numeral designating gear | | Number of teeth in gear |
|---|---|---|
| 41 | Motor power | 24 |
| 42 | do | 56 |
| 43 | Forward clutch | 24 |
| 46 | do | 96 |
| 44 | Backward clutch | 20 |
| 48 | do | Idler |
| 47 | do | 80 |
| 98 | Worm drive | 24 |
| 99 | do | 96 |

*Gear train in Fig. 16*

| Reference numeral designating gear | | Number of teeth in gear |
|---|---|---|
| 208 | Low speed clutch | 24 |
| 185 | do | 96 |
| 209 | High speed clutch | 56 |
| 186 | do | 64 |
| 180 | Transmission | 80 |
| 210 | do | 80 |
| 43' | Forward clutch | 24 |
| 46' | do | 96 |
| 44' | Backward clutch | 20 |
| 48' | do | Idler |
| 47' | do | 80 |
| 98' | Worm drive | 24 |
| 99' | do | 96 |

From the foregoing it will be clear that time is saved by the ability of the finder automatically to set up a higher speed of travel when it has far to travel in following up the pilot and that this higher speed takes place under suitable conditions in either direction of follow-up travel. Conversely the automatic slowing down of the finder travel just as it nears a position of register with the pilot is valuable as a preventative against overrunning such position of register which would necessitate the finder reversing its direction to attain register. The slower speed of travel reduces the kinetic energy of the traveling finder arm 152 and all of the moving parts which it carries and by which it is driven. It also lessens the requirement for retarding action by the constantly acting friction brake 92. All of these automatic speed changing effects are accomplished by the same two simple photoelectric circuit controllers that serve to start and stop the follow-up travel of the finder in either direction in which the pilot chances to move in departing from register therewith.

It is obvious that the underlying mechanical and electrical principles on which these improvements are based may be incorporated in various forms of apparatus and electric circuit arrangements differing in details from those herein disclosed. For instance, clutch operating solenoids such as 132, 133, 132', 133' and 206 may be energized and deenergized on corresponding occasions by means of electric circuits whose control is effected by changes produced in associated oscillatory circuits by such circuit balancing and unbalancing elements as relatively movable condenser plates or elements substituted for the photoelectric tubes and light sources proposed herein. It is intended to cover the invention in its broadest aspects, and the definitions of the following claims will be understood as inclusive of all fair substitutes and equivalents for the elements and arrangements herein disclosed as illustrative construction.

The following is claimed:

1. Automatic pilot hunting apparatus including the combination of, a pilot movable forward and backward to random positions of dwell, a finder movable to follow up said pilot to attain a position of register therewith, finder controlling electric circuits, a motor powered to run constantly independently of said circuits, controllers for said circuits including elements adapted to affect the transmission of radiant energy and operative in registering relationship to condition said circuits inactively, means confining said elements to respectively separate paths of non conflicting movement to and from said registering relationship, mechanical connections enabling movement of said pilot away from positions of register with said finder to cause corresponding movement between said elements thereby to condition respectively different circuits actively when said pilot is displaced from said finder in respectively opposite directions, and mechanical connections enabling said motor to drive said finder in opposite directions when respectively different control circuits are actively conditioned including direction reversing clutch mechanism constructed and arranged to permit said finder to dwell when said circuits are inactively conditioned.

2. Automatic pilot hunting apparatus as defined in claim 1, in which the said direction reversing clutch mechanism includes a pair of clutch faces shiftable in unison between neutral and forward and backward driving positions.

3. Automatic pilot hunting apparatus as defined in claim 1, in which the said direction reversing clutch mechanism includes neighboring forward-driving and backward-driving clutch members connected to be impelled simultaneously and constantly by the said motor, and a cooperative driven clutch member connected to impel the said finder and shiftable between positions for engaging with either of said driving clutch members.

4. Automatic pilot hunting apparatus as defined in claim 1, in which the said direction reversing clutch mechanism includes spaced forward-driving and backward-driving neighboring clutch members connected to be impelled simultaneously and constantly by the said motor, a cooperative driven clutch member reciprocative between said clutch members and connected to impel the said finder, electromagnets connected respectively in said different circuits, and shifter linkage operated by said electromagnets connected to reciprocate said driven clutch member.

5. Automatic pilot hunting apparatus, including the combination of, a pilot movable forward and backward to random positions of dwell, a finder movable to follow up said pilot for attaining a position of register therewith, electric circuits, a constant speed motor constantly running independently of said circuits, controllers for said circuits including elements arranged to be moved relative to each other by relative movement between said pilot and said finder and operative to effect change in different circuits when said pilot is displaced respectively different distances from register with said finder, and speed changing mechanism differently responsive to electrical changes effected by said controllers in respectively different circuits and thereby rendered operative to transmit movement from said motor to said finder either at relatively low speed or relatively high speed.

6. Automatic pilot hunting apparatus as defined in claim 5, in which the said speed changing mechanism includes a clutch shiftable between positions for transmitting low speed and high speed respectively.

7. Automatic pilot hunting apparatus as defined in claim 5, in which the said speed changing mechanism includes neighboring low-speed and high-speed clutch members connected to be impelled simultaneously and constantly by the said motor, and a cooperative driven clutch member connected to impel said finder and shiftable between positions for engaging with either of said driving clutch members.

8. Automatic pilot hunting apparatus as defined in claim 5, in which the said speed changing mechanism includes spaced forward-driving and backward-driving neighboring clutch members connected to be impelled simultaneously and constantly by the said motor, a cooperative driven clutch member reciprocative between said driving clutch members and connected to impel said finder, an electromagnet connected respectively in one of said different circuits, and shifter linkage operated by said electromagnet and connected to reciprocate said driven clutch member.

9. Automatic pilot hunting apparatus, including the combination of, a pilot movable forward and backward to random positions of dwell, a finder movable to follow up said pilot for attaining a position of register therewith, electric circuits, a uni-directional motor constantly powered and running independently of said circuits, controllers for said circuits including an element traveling with said pilot and a cooperative element traveling with said finder and operative to normally condition said circuits when said pilot and finder mutually register and to effect change in different circuits when said pilot is displaced from register with said finder in respectively opposite directions, electro mechanically operative direction reversing mechanism operably responsive to changes effected by said controllers in certain of said circuits and operative to transmit movement from said motor to said finder in respectively opposite directions when said change is effected in different circuits and also operative to terminate said movement when said circuits are normally conditioned, and electro mechanically operative speed changing mechanism responsive to changes effected by said controllers in another of said circuits and operative to transmit movement between said motor and said finder either at relatively low speed or at relatively high speed.

10. Automatic pilot hunting apparatus as defined in claim 9, in which the said direction reversing mechanism includes a three-position reciprocative clutch with two electromagnets mechanically connected to shift said clutch in respectively opposite directions, and the said speed changing mechanism includes a two-position reciprocative clutch with a third electromagnet mechanically connected to shift said two-position clutch in one direction, and resilient means connected to bias said two-position clutch in the opposite direction.

11. Automatic pilot hunting apparatus as defined in claim 9, in which the said direction reversing mechanism includes plural trains of direction differing gears, and the said speed changing mechanism includes plural trains of speed differing gears, together with an additional train of gears arranged to transmit motion from said speed differing gears to said direction differing gears, and a further train of gears arranged to transmit motion from said direction differing gears to the said finder.

12. Automatic pilot hunting apparatus as defined in claim 9, in which the said direction reversing mechanism includes plural trains of direction differing gears, and the said speed changing mechanism includes plural trains of speed differing gears, together with an additional train of gears arranged to transmit motion from said speed differing gears to said direction differing gears, and a further train of gears including a worm and worm wheel arranged to transmit motion from said direction differing gears to the said finder.

13. Automatic pilot hunting apparatus as defined in claim 1, in which the said direction reversing mechanism includes separate gear trains powered by said motor to run simultaneously in respectively opposite directions, together with an additional train of gears including a worm and worm wheel arranged to transmit motion from said separate gear trains to the said finder and operative to resist transmission of motion from said finder to said separate gear trains.

14. Automatic pilot hunting apparatus, including the combination of, a pilot movable forward and backward to random positions of dwell, a finder movable to follow up said pilot for attaining a position of register therewith, electric circuits, a uni-directional motor constantly powered and running independently of said circuits, controllers for said circuits including cooperative elements arranged to be moved relatively to each other by relative movement between said pilot and said finder and operative to normally condition said circuits when said pilot and finder mutually register and to effect change in different circuits when said pilot is displaced from register with said finder in respectively opposite directions, electromechanically operative direction reversing mechanism operably responsive to said circuits and operative to transmit movement from said motor to said finder in respectively opposite directions when said change is effected in different circuits and also operative to terminate said movement when said circuits are normally conditioned, a friction brake constructed and arranged to be cooperative constantly with said direction reversing mechanism in a manner yieldingly to oppose motor driven movement transmitted to said finder by said mechanism, and at least one limit switch operably related to said finder and connected and arranged to deprive said finder of the impelling power of said motor in predetermined positions of the finder.

15. Automatic pilot hunting apparatus, including the combination of, a pilot movable forward and backward to random positions of dwell, a finder movable to follow up said pilot for attaining a position of register therewith, electric circuits, a uni-directional motor constantly powered and running independently of said circuits, controllers for said circuits including cooperative elements arranged to be moved relatively to each other by relative movement between said pilot and said finder and operative to normally condition said circuits when said pilot and finder mutually register and to effect change in different circuits when said pilot is displaced from register with said finder in respectively opposite directions, electromechanically operative direction reversing mechanism operably responsive to said circuits and operative to transmit movement from said motor to said finder in respectively opposite directions when said change is effected in different circuits and also operative to terminate said movement when said circuits are normally conditioned, said cooperative elements of said controllers including two sources of light, two photoelectric cells, and separate light gates interposed between each of said sources and cells traveling with said finder and spaced apart in the direction of travel, together with a light baffle traveling with said pilot broad enough in the direction of travel to be able in the normal relationship of pilot to finder to completely cover both of said light gates simultaneously.

16. Automatic pilot-hunting apparatus as defined in claim 9, in which certain of the said cooperative elements of the said controllers travel with the said finder and include two sources of light, two photoelectric cells, and separate light gates interposed between each of said sources and cells and spaced apart in the direction of travel, and another of said cooperative elements travels with said pilot and includes a light baffle so proportioned and so movably related to said light gates that progressive displacement of said pilot from said finder causes said baffle to uncover said light gates one by one.

17. Automatic pilot hunting apparatus, including the combination of, a stationary frame, a pilot, means to move said pilot forward and backward relative to said frame to random positions of dwell in response to changes in a measurable condition, a finder movable relative to said frame to follow up said pilot for attaining a position of register therewith, electric circuits, a uni-directional motor constantly powered and running independently of said circuits, devices for controlling said circuits traveling relatively to said frame respectively with said pilot and with said finder and operative to normally condition said circuits when said pilot and finder mutually register and to effect change in different circuits when said pilot is displaced from register with said finder in respectively opposite directions, and direction reversing clutch mechanism electrically operably by said circuits and mechanically operative to transmit movement from said motor to said finder in respectively opposite directions when said change is effected in different circuits and mechanically operative to terminate said movement when said circuits are normally conditioned.

18. The combination of, a stationary instrument frame, a free pilot movable backward and forward relative to said stationary frame in accordance with changes in a variable condition to be registered by the instrument, a finder mounted to perform movements backward and forward relative to said stationary frame for following said movements of said pilot, a substantially constant speed motor, and change-speed mechanism connected to transmit motion from said motor to said finder including speed changing means electrically controllable by relative movement between said pilot and finder in a manner to cause said finder to follow said pilot at differing speeds.

19. The combination of, a stationary instrument frame, a free pilot movable backward and forward relative to said stationary frame in accordance with changes in a variable condition to be registered by the instrument, a finder mounted to perform movements backward and forward relative to said stationary frame for following said movements of said pilot, a substantially constant speed motor, and change-speed mechanism connected to transmit motion from said motor to said finder including speed changing means electrically controllable by approaching and by separating movements of said pilot and finder in a manner to cause said finder to follow said pilot at differing speeds in either a forward or backward direction.

20. Automatic pilot hunting apparatus, including the combination of, a stationary instrument frame, a free pilot mounted and arranged to perform movement backward and forward relative to said stationary frame in unhindered accordance with changes in a variable condition to be registered by the instrument, a finder mounted and arranged to be clear of the path of movement of said pilot and adapted to follow the movements thereof backward and forward relative to said stationary frame, electrical control circuits, a unidirectional motor constantly powered to run independently of said circuits, direction reversing clutches electrically operable through said circuits respectively and mechanically connected to transmit movement from said motor to said finder in either of opposite directions, and controlling means for said circuits including radiant energy governing devices free to pass each other and connected to move in accordance with the movements of said pilot and said finder respectively.

21. Automatic pilot hunting apparatus, including the combination of, a stationary instrument frame, a free pilot mounted and arranged to perform movement backward and forward relative to said stationary frame in unhindered accordance with changes in a variable condition to be registered by the instrument, a finder mounted and arranged to be clear of the path of movement of said pilot and adapted to follow the movements thereof backward and forward relative to said stationary frame, electrical control circuits, a unidirectional motor constantly powered to run independently of said circuits, direction reversing mechanically reciprocative clutch means connected to transmit movement from said motor to said finder in respectively reverse directions, electromagnetic means electrically operable through said circuits including separate magnetic armatures mechanically operative to reciprocate said clutch means, and controlling instrumentalities for said circuits including radiant energy governing devices physically free to pass each other and connected to move in accordance with the movements of said pilot and said finder respectively.

OSWALD S. CARLISS.
CHARLES G. ROPER.